(12) United States Patent  
Massey et al.

(10) Patent No.: US 6,515,227 B1
(45) Date of Patent: Feb. 4, 2003

(54) FIBER OPTIC CABLE MANAGEMENT ENCLOSURE WITH INTEGRAL BEND RADIUS CONTROL

(75) Inventors: Gaines N. Massey, Simpsonville, SC (US); George A. Walker, Simpsonville, SC (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

(21) Appl. No.: 10/155,513

(22) Filed: May 24, 2002

(51) Int. Cl.[7] ................................................. G02B 6/00
(52) U.S. Cl. .................... 174/50; 174/DIG. 9; 385/134; 312/223.6
(58) Field of Search ................................. 174/50, 65 R, 174/72 A, DIG. 9; 385/134, 135; 312/223.6

(56) References Cited

U.S. PATENT DOCUMENTS

| | | | |
|---|---|---|---|
| 4,630,886 A | 12/1986 | Lauriello et al. | 350/96.2 |
| 4,708,430 A | 11/1987 | Donaldson et al. | 350/96.2 |
| 4,824,196 A | 4/1989 | Bylander | 350/96.2 |
| 4,900,123 A | 2/1990 | Barlow et al. | 350/96.2 |
| 4,971,421 A | 11/1990 | Ori | 350/96.2 |
| 5,093,885 A | 3/1992 | Anton | 385/134 |
| 5,208,894 A | 5/1993 | Johnson et al. | 385/135 |
| 5,530,954 A | 6/1996 | Larson et al. | 385/135 |
| 5,778,130 A | 7/1998 | Walters et al. | 385/134 |
| 5,825,962 A | 10/1998 | Walters et al. | 385/135 |
| 5,898,129 A | 4/1999 | Ott et al. | 174/59 |
| 6,175,079 B1 | 1/2001 | Johnston et al. | 174/50 |
| 6,181,862 B1 | 1/2001 | Noble et al. | 385/135 |
| 6,215,938 B1 | 4/2001 | Reitmeier et al. | 385/135 |
| 6,245,998 B1 * | 6/2001 | Curry et al. | 174/72 A |
| 6,250,816 B1 | 6/2001 | Johnston et al. | 385/53 |
| 6,363,198 B1 | 3/2002 | Braga et al. | 385/134 |
| 6,388,891 B1 * | 5/2002 | Falkenberg et al. | 361/796 |
| 6,411,766 B1 * | 6/2002 | Bechamps et al. | 385/134 |

* cited by examiner

Primary Examiner—Anthony Dinkins
Assistant Examiner—Adolfo Nino
(74) Attorney, Agent, or Firm—Robert P. Lenart; Tracey D. Beiriger

(57) ABSTRACT

An enclosure for use in a cable management system includes an outer shell having a generally rectangular shape and defining an interior space. The outer shell includes a bottom wall and a sidewall, with the sidewall defining a sidewall opening for access to the interior space. The bottom wall includes a curved portion adjacent to a first edge. A tray positioned within the interior of the enclosure includes a curved portion positioned adjacent to a first edge of the tray. The first edge of the bottom wall and the first edge of the tray are positioned adjacent to each other such that the curved portion of the bottom wall and the curved portion of the tray together form a first radius control structure positioned adjacent to the sidewall opening.

6 Claims, 2 Drawing Sheets

FIBER OPTIC CABLE MANAGEMENT ENCLOSURE WITH INTEGRAL BEND RADIUS CONTROL

FIELD OF THE INVENTION

This invention relates to fiber optic cable management systems, and more particularly to enclosures for use in fiber optic cable management systems.

BACKGROUND OF THE INVENTION

Fiber optic management systems provide termination and service access points for fiber optic circuits. Where a large number of fiber optic cables are to be connected, connections are typically made in fiber distribution frames. The frames can be comprised of multiple equipment racks that form bays for containing fiber optic management components, such as splice boxes and connection modules.

Enclosures for use in fiber optic cable management systems have been the subject of several patents, including U.S. Pat. Nos. 6,363,198; 6,250,816; 6,215,938; 6,181,862; 6,175,079; 5,898,129; 5,825,962; 5,778,130; 5,530,954; 5,208,894; 5,093,885; 4,971,421; 4,900,123; 4,824,196; 4,708,430; and 4,630,886.

Fiber optic cables must be installed in a manner such that a minimum bend radius is maintained. To assist in maintaining the required minimum bend radius, radius control guides have been used in various fiber optic cable enclosure. Most radius control guides are built as separate pieces and riveted or bolted in place as needed. These separate pieces can be easily broken, removed or omitted from enclosures.

There is a need for a fiber optic cable enclosure that includes improved provisions for maintaining the minimum bend radius.

SUMMARY OF THE INVENTION

Enclosures for use in cable management systems constructed in accordance with the invention include an outer shell having a generally rectangular shape and defining an interior space. The outer shell includes a bottom wall and a sidewall, with the sidewall defining a sidewall slot for access to the interior space of the enclosure. The bottom wall includes a curved portion adjacent to a first edge. A tray positioned within the interior of the enclosure includes a curved portion positioned adjacent to a first edge of the tray. The first edge of the bottom wall and the first edge of the tray are positioned adjacent to each other such that the curved portion of the bottom wall and the curved portion of the tray together form a first radius control structure positioned adjacent to the sidewall slot.

An adapter plate can be mounted within the interior of the enclosure. The adapter plate can define one or more openings for mounting various cable management devices.

A second radius control structure can be positioned adjacent to the sidewall opening. The enclosure can further include a door for covering the front opening of the enclosure, and a latch attached to the door, wherein the latch is positioned adjacent to the center of one edge of the door.

DETAILED DESCRIPTION OF THE INVENTION

Figure 1:
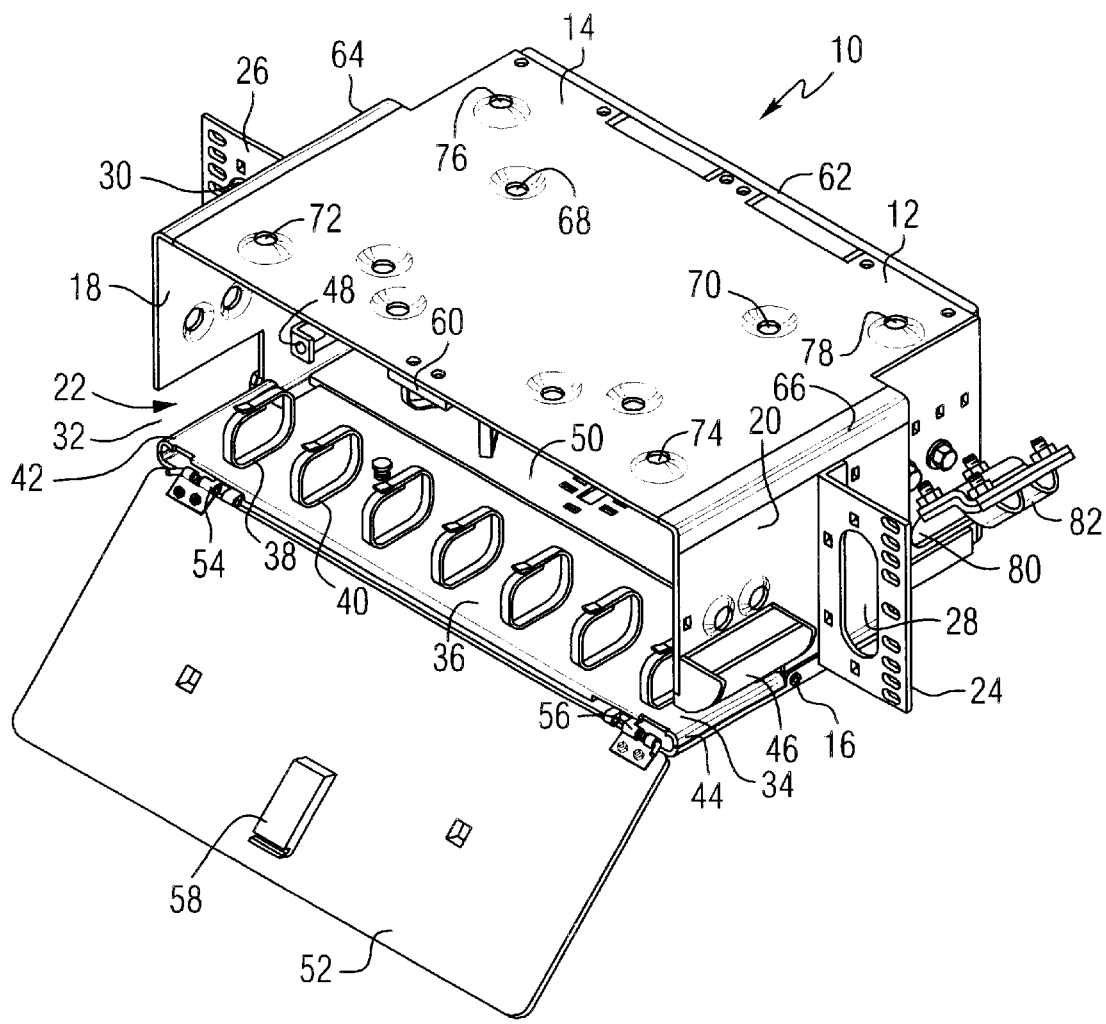
FIG. 1 is an isometric view of an enclosure constructed in accordance with the invention.

Referring to the drawings, FIG. 1 is an isometric view of an enclosure 10 constructed in accordance with the invention. The enclosure includes a generally rectangular shell 12 including top 14, a bottom 16, and first and second sides 18 and 20. The enclosure forms an interior space 22 that can accommodate a variety of well known fiber optic cable components, such as connectors, adapters, modules, etc.

Mounting brackets 24 and 26 are connected to the sidewalls and are provided for attaching the enclosure to an equipment rack. The brackets incorporate a pass through design in that holes 28 and 30 are provided for cables to be passed from the rear of the enclosure to the front. The mounting brackets can also provide a mounting location for a cable shield that protects the cable from damage from falling debris.

The sidewalls define openings 32 and 34 near the front of the enclosure so that cables can pass into the enclosure. In this illustrated embodiment, the openings in the sidewalls are in the form of slots having an open end at the front of the enclosure. By using such slots, cables can be routed by sliding them into the slots. This avoids the process of threading the cables through openings in the enclosure walls and can reduce the amount of bending required during the cable installation process.

A tray 36 is positioned in the interior of the enclosure, and can include cable management devices such as clamps 38 and 40 for restraining cables with the enclosure. Cable bend radius control structures 42 and 44 are formed by end portions of the bottom and the tray. Additional bend radius control structures, for example cable guide 46, can be added to the enclosure adjacent to the sidewall openings.

Brackets, such as bracket 48 can be included within the enclosure for mounting a master adapter plate, as described below in FIG. 3. A second tray 50 can be positioned behind the location of the adapter plate, and can include additional cable restraining structures.

A door 52 is shown to be mounted to the front edge of the enclosure by hinges 54 and 56. The door is preferably made of a relatively thin and slightly flexible material, such as polycarbonate. A latch 58 is mounted adjacent to one edge of the door and substantially in the center of the edge. The latch couples to a clip 60 mounted on the enclosure. Since the latch is positioned near the center of one edge of the door, the edges of the door away from the latch can be deflected slightly in the event that a cable is pinned between the door and the front edge of the enclosure, thereby reducing the likelihood of excessive pinching of the cable.

The front door is provided with a single latch point for one hand operation. A second door 62 can be provided on a rear opening of the enclosure. Ergonomic enclosure design incorporates rounded corners, for example 64 and 66, to prevent pinch points for fiber optic cables and to provide a modern look for the enclosure. The rounded corners also reduce the number of points where fiber optic cables could micro bend when pulled in tension across the edge of an enclosure.

A plurality of holes, for example 68 and 70, are provided in a top panel to accept a variety of hardware, such as splice tray drawer mechanisms, or record rack types of splice tray holding apparatus. Additional holes 72, 74, 76 and 78 facilitate joining two or more enclosures together if there should be a need to stack and join enclosures.

The enclosure can include an additional opening 80 for entrance and exit of cables in the rear portion of the enclosure, along with an associated clamping device 82. While a rack mounted enclosure is shown in FIG. 1, the enclosure can alternatively be wall-mounted, for example by placing screws in the rear door 62 and then attaching the screws to the wall. The front and rear doors can be removed and replaced by metal and/or lockable door options to discourage tampering.

Ergonomic design gives the enclosure a modern look and also reduces the number of possible snagging points for fiber optic cable strands to reduce the probability of microbends in the cable when pulled in tension over the edge of an enclosure.

Figure 2:
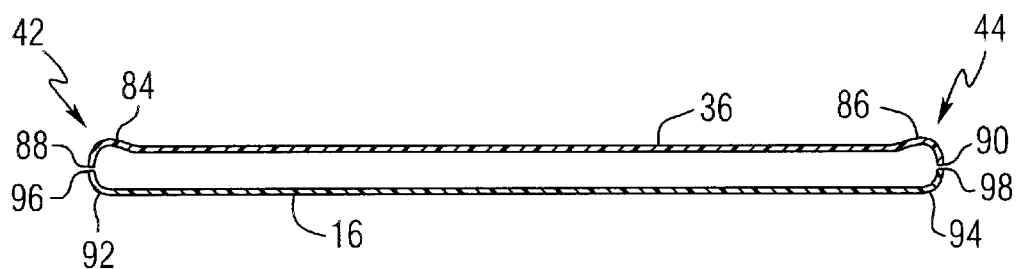
FIG. 2 is a cross-sectional view of a portion of the enclosure of FIG. 1.

FIG. 2 is a cross-sectional view of a portion of the enclosure of FIG. 1 taken near the front of the bottom wall, and illustrates the integral cable bend radius control structures. FIG. 2 shows that the tray 36 includes curved portions 84 and 86 adjacent to opposite edges 88 and 90 of the tray. Similarly, the bottom wall 16 includes curved portions 92 and 94 adjacent to opposite edges 96 and 98 of the bottom. The edges of the tray and edges of the bottom are positioned adjacent to each other such that the curved portions of the bottom wall and the curved portions of the tray together form radius control structures 42 and 44. These radius control structures are positioned adjacent to the sidewall openings in the form of slots 22 and 34 in FIG. 1.

Figure 3:
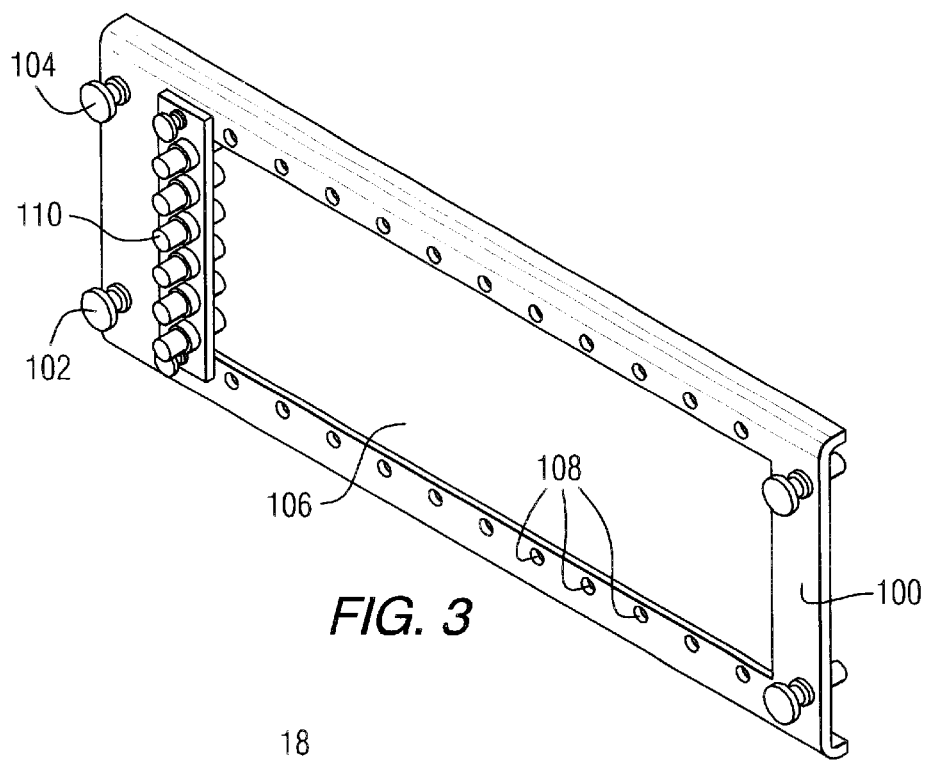
FIG. 3 is an isometric view of an adapter plate that can be used in combination with the enclosure of FIG. 1.

FIG. 3 is an isometric view of a master plate 100 that can be used in combination with the enclosure of FIG. 1. The adapter plate 100 can be mounted vertically within the interior of the enclosure using, for example, spring loaded clips 102 and 104. The adapter plate defines a substantially rectangular opening 106. Openings 108 can be provided near the opening 106 for attachment of modular cable management devices, such as module 110.

The master plate that can hold fiber optic modules or adapter plates and can be centrally located in the enclosure. The master plate 100 can be removed for making the enclosure a splice enclosure with the addition of a splice tray holder or slide tray mechanism.

Figure 4:
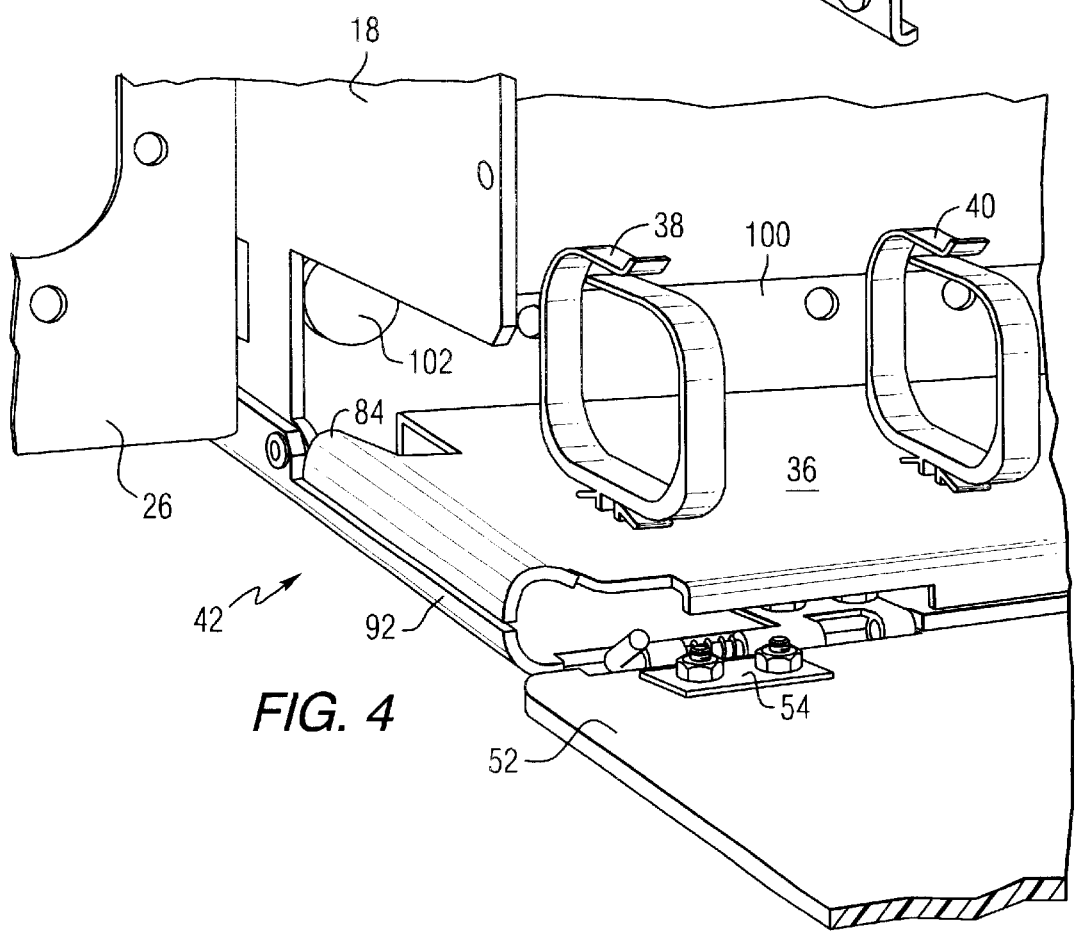
FIG. 4 is an enlarged isometric view of a portion of the enclosure of FIG. 1.

FIG. 4 is an enlarged isometric view of a portion of the enclosure of FIG. 1. FIG. 4 clearly illustrates how the cable bend radius control structure 42 is formed by one curved portion 84 of the tray 36 and one curved portion 92 of the bottom 16.

The radius control structures of the enclosures of this invention are formed by integral portions of the removable fiber optic management tray that are positioned adjacent to edges of the bottom of the enclosure Thus the invention provides an enclosure with built-in radius control surfaces that avoid the use of easily misplaced removable devices that can get hit and fall off during servicing.

This invention provides enclosures which allow fiber optic cable to be routed into the front of the enclosure and over cable radius control guides built into the removable cable management tray. The radius control guides of this invention provide radius control coupled with an ergonomic design of rounded corners on the enclosure itself. The rounded edges of the bottom of the enclosure cooperate with the tray to form a bend radius control structure adjacent to the cable access openings.

The enclosures of this invention provide for cross connects and general fiber optic cable handling with a cable bend radius control surface that is integral to a cable management tray.

While the invention has been described in terms of particular embodiments, it will be apparent to those skilled in the art that various changes can be made to the disclosed embodiments without departing from the invention as defined by the following claims.

What is claimed is:

1. An enclosure for use in a cable management system comprising:

an outer shell having a generally rectangular shape and defining an interior space, the outer shell including a bottom wall and a sidewall, the sidewall defining a sidewall opening for access to the interior space;

the bottom wall including a curved portion adjacent to a first edge of the bottom wall; and a tray positioned within the interior of the enclosure, the tray including a curved portion positioned adjacent to a first edge of the tray, wherein the first edge of the bottom wall and the first edge of the tray are positioned adjacent to each other such that the curved portion of the bottom wall and the curved portion of the tray together form a first radius control structure positioned adjacent to the sidewall opening.

2. An enclosure according to claim 1, wherein the sidewall opening comprises:

a slot having an open end adjacent to a front of the enclosure.

3. An enclosure according to claim 1, further comprising:

an adapter plate mounted adjacent to the tray and within the interior of the enclosure.

4. An enclosure according to claim 3, wherein the adapter plate defines a substantially rectangular opening.

5. An enclosure according to claim 1, further comprising:

a second radius control structure positioned adjacent to the sidewall opening.

6. An enclosure according to claim 1, further comprising:

a door for covering a front opening of the enclosure; and a latch attached to the door, wherein the latch is positioned adjacent to the center of one edge of the door.

* * * * *